US008626392B2

(12) United States Patent
Kojo

(10) Patent No.: US 8,626,392 B2
(45) Date of Patent: Jan. 7, 2014

(54) VEHICLE RUNNING CONTROL APPARATUS

(75) Inventor: Takahiro Kojo, Gotenba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/386,059

(22) PCT Filed: Jun. 23, 2010

(86) PCT No.: PCT/JP2010/060642
§ 371 (c)(1),
(2), (4) Date: Jan. 20, 2012

(87) PCT Pub. No.: WO2011/161779
PCT Pub. Date: Dec. 29, 2011

(65) Prior Publication Data
US 2012/0123642 A1    May 17, 2012

(51) Int. Cl.
*G06F 19/00*    (2011.01)
(52) U.S. Cl.
USPC .......... 701/41; 701/3; 701/16; 114/163; 114/246; 114/253; 114/255; 114/330; 440/11; 440/12; 440/30; 318/583; 180/117; 180/120; 244/2; 244/50; 244/183
(58) Field of Classification Search
USPC .......... 701/3, 16, 41; 114/163, 246, 253, 330, 114/255; 440/11, 12, 30, 61 R, 61 S; 244/2, 244/50, 183, 3.11; 180/117, 120; 318/583
See application file for complete search history.

(56) References Cited

U.S. PATENT DOCUMENTS

| 4,881,700 | A | * | 11/1989 | Sarh .................................. 244/2 |
| 4,986,493 | A | * | 1/1991 | Sarh .................................. 244/2 |
| 6,212,453 | B1 | | 4/2001 | Kawagoe et al. |
| 6,263,270 | B1 | | 7/2001 | Sato et al. |
| 6,789,008 | B2 | | 9/2004 | Kato et al. |
| 7,206,684 | B2 | | 4/2007 | Takeda |
| 7,305,285 | B2 | * | 12/2007 | Villaume et al. .................. 701/3 |

(Continued)

FOREIGN PATENT DOCUMENTS

| EP | 2050653 B1 | 9/2010 |
| JP | 10 152063 | 6/1998 |

(Continued)

OTHER PUBLICATIONS

International Search Report Issued Aug. 31, 2010 in PCT/JP10/60642 Filed Jun. 23, 2010.

(Continued)

*Primary Examiner* — Mcdieunel Marc
(74) *Attorney, Agent, or Firm* — Oblon, Spivak, McClelland, Maier & Neustadt, L.L.P.

(57) ABSTRACT

A vehicle driving control apparatus is provided at least with: a rudder angle varying device capable of changing a relation between a steering angle, which is a rotation angle of a steering input shaft, and a rudder angle, which is a rotation angle of steered wheels; and a trajectory controlling device for controlling the rudder angle varying device such that a trajectory of a vehicle approaches a target driving route of the vehicle. The vehicle driving control apparatus is further provided with a changing device for changing responsiveness of control by the trajectory controlling device when there is a steering input given to the steering input shaft through a steering wheel by a driver of the vehicle.

3 Claims, 3 Drawing Sheets

(56) References Cited

U.S. PATENT DOCUMENTS

| | | |
|---|---|---|
| 7,809,483 B2 | 10/2010 | Nishikawa |
| 8,392,064 B2 | 3/2013 | Thrun et al. |
| 2003/0213640 A1 | 11/2003 | Kato et al. |
| 2005/0027402 A1 | 2/2005 | Koibuchi et al. |
| 2005/0267661 A1 | 12/2005 | Iwazaki et al. |
| 2006/0142921 A1 | 6/2006 | Takeda |
| 2007/0192005 A1 | 8/2007 | Ishikawa et al. |
| 2007/0225914 A1 | 9/2007 | Kawazoe et al. |
| 2008/0091318 A1 | 4/2008 | Deng et al. |
| 2008/0091321 A1 | 4/2008 | Nishikawa |
| 2008/0195275 A1 | 8/2008 | Kojo et al. |
| 2010/0114431 A1 | 5/2010 | Switkes et al. |
| 2010/0256869 A1 | 10/2010 | Lich et al. |
| 2011/0264329 A1* | 10/2011 | Limpibunterng et al. ...... 701/41 |
| 2012/0029773 A1* | 2/2012 | Fujita et al. ............ 701/41 |
| 2012/0109411 A1 | 5/2012 | Tokimasa et al. |
| 2012/0109414 A1 | 5/2012 | Kumabe et al. |
| 2012/0109460 A1 | 5/2012 | Tokimasa et al. |
| 2012/0123642 A1 | 5/2012 | Kojo |
| 2012/0123643 A1* | 5/2012 | Limpibuntering et al. ..... 701/42 |
| 2012/0197496 A1 | 8/2012 | Limpibunterng et al. |
| 2012/0203431 A1* | 8/2012 | Kojo et al. ............ 701/41 |
| 2012/0215406 A1 | 8/2012 | Tanimoto et al. |
| 2012/0226417 A1 | 9/2012 | Nishikawa |
| 2012/0253602 A1 | 10/2012 | Fujita et al. |
| 2012/0363217 | 11/2012 | Reichel et al. |

FOREIGN PATENT DOCUMENTS

| | | |
|---|---|---|
| JP | 11 78934 | 3/1999 |
| JP | 11 245832 | 9/1999 |
| JP | 2000 142441 | 5/2000 |
| JP | 2004-098744 | 4/2004 |
| JP | 2005-153779 | 6/2005 |
| JP | 2005-172528 | 6/2005 |
| JP | 2005-343184 | 12/2005 |
| JP | 2006-143101 | 6/2006 |
| JP | 2006-206011 | 8/2006 |
| JP | 2007 160998 | 6/2007 |
| JP | 2007-302017 | 11/2007 |
| JP | 2008 13123 | 1/2008 |
| JP | 2008 44427 | 2/2008 |
| JP | 2008-120338 | 5/2008 |
| JP | 2008 137612 | 6/2008 |
| JP | 2008-162566 | 7/2008 |
| JP | 2008-174013 | 7/2008 |
| JP | 2008-213522 | 9/2008 |
| JP | 2009 190464 | 8/2009 |
| JP | 2009 226981 | 10/2009 |
| JP | 2010 89692 | 4/2010 |
| JP | 2010 120532 | 6/2010 |
| JP | 2011 31769 | 2/2011 |
| JP | 2011 31770 | 2/2011 |
| WO | 2010-073400 A1 | 7/2010 |
| WO | 2011 161777 | 12/2011 |

OTHER PUBLICATIONS

Office Action issued on Apr. 11, 2013 in related U.S. Appl. No. 13/141,875.

Notice of Allowance dated Aug. 14, 2013, in co-pending U.S. Appl. No. 13/502,760, filed Apr. 19, 2012.

* cited by examiner

VEHICLE RUNNING CONTROL APPARATUS

TECHNICAL FIELD

The present invention relates to a vehicle driving control apparatus for performing, for example, lane keeping assist (LKA) or the like in a vehicle provided with various steering mechanisms such as, for example, an electronic controlled power steering (EPS) and a variable gear ratio steering (VGRS).

BACKGROUND ART

This type of apparatus suggested is, for example, an apparatus for controlling an electric power steering and a braking pressure of each wheel in order to achieve a target rudder angle in a lane keeping mode of a vehicle and for controlling a steering gear ratio varying apparatus in order to reduce a yaw angle deviation and a lateral position deviation of the vehicle with respect to a driving route (refer to a patent document 1).

Alternatively, another apparatus suggested is an apparatus for reducing and correcting a control amount of steering control in accordance with a steering wheel operating state and a steering wheel operating direction if a conscious steering wheel operation by a driver is detected when a rudder angle of rear wheels of the vehicle is controlled to perform the steering control of the vehicle (refer to a patent document 2).

Alternatively, another apparatus suggested is an apparatus for reducing a target control amount of a target control torque if a steering direction of the target control torque is different from a steering direction of a steering torque and if there is control interference when the steering torque is controlled by an electric power steering apparatus such that the vehicle keeps a driving lane and drives on it (refer to a patent document 3).

Alternatively, another apparatus suggested is an apparatus for steering by controlling a motor current and rotationally controlling a steering motor such that the rudder angle is equal to the target rudder angle (refer to a patent document 4). Here, in particular, it is disclosed that the motor current is reduced in accordance with an increase in the steering torque value when a direction indicated by a steering torque value of a steering wheel detected by a torque sensor is equal to a direction of the target rudder angle and that the motor current is increased in accordance with the increase in the steering torque value when the direction indicated by the steering torque value is opposite to the direction of the target rudder angle.

PRIOR ART DOCUMENT

Patent Document

Patent document 1: Japanese Patent Application Laid Open No. 2007-160998
Patent document 2: Japanese Patent Application Laid Open No. Hei 11-245832
Patent document 3: Japanese Patent Application Laid Open No. 2009-190464
Patent document 4: Japanese Patent Application Laid Open No. Hei 11-078934

DISCLOSURE OF INVENTION

Subject to be Solved by the Invention

However, the apparatus described in the patent document 1 has such a technical problem that the driver likely feels uncomfortable due to different vehicle responsiveness to a steering amount between cases where the direction of vehicle trajectory control caused by the lane keeping and the steering direction by the driver of the vehicle match and do not match. Moreover, on the apparatuses described in the patent documents 2 to 4, the control amount is changed in accordance with whether or not the direction of the trajectory control and the steering direction match; however, there is such a technical problem that the driver likely feels uncomfortable due to the vehicle responsiveness.

In view of the aforementioned problems, it is therefore an object of the present invention to provide a vehicle driving control apparatus capable of suppressing the driver's uncomfortable feeling caused by the vehicle responsiveness.

Means for Solving the Subject

The above object of the present invention can be achieved by a vehicle driving control apparatus provided with: a rudder angle varying device capable of changing a relation between a steering angle, which is a rotation angle of a steering input shaft, and a rudder angle, which is a rotation angle of steered wheels; and a trajectory controlling device for controlling the rudder angle varying device such that a trajectory of a vehicle approaches a target driving route of the vehicle, the_vehicle driving control apparatus provided with: a changing device for changing responsiveness of control by the trajectory controlling device when there is a steering input given to the steering input shaft through a steering wheel by a driver of the vehicle.

According to the vehicle driving control apparatus of the present invention, the vehicle driving control apparatus is provided at least with the rudder angle varying device and the trajectory controlling device. The rudder angle varying device can change the relation between the steering angle, which is the rotation angle of the steering input shaft, and the rudder angle, which is the rotation angle of the steered wheels. The rudder angle varying device conceptually includes various physical, mechanical, electrical, or magnetic apparatuses capable of varying the relation between the steering angle and the rudder angle in a stepwise or continuous manner. According to the rudder angle varying device, the relation between the steering angle and the rudder angle is not primarily or uniformly defined. For example, a ratio between the steering angle and the rudder angle can be changed, or the rudder can be change independently of the steering angle.

The trajectory controlling device, which is provided, for example, with a memory, a processor and the like, controls the rudder angle varying device such that the trajectory of the vehicle approaches the target driving route of the vehicle. Specifically, for example, on the basis of images of the target driving route imaged by an in-vehicle camera or the like, curvature of the target driving route, a positional deviation between the vehicle and a white line or the like for defining the target driving route, and a yaw angle deviation and the like are calculated or estimated. On the basis of them, target lateral acceleration for enabling the trajectory of the vehicle to approach the target driving route is calculated or estimated. Then, on the basis of the calculated or estimated target lateral acceleration, a control amount is determined to obtain the target lateral acceleration, for example, caused by a change in the rudder angle by the rudder angle varying device. On the basis of the determined control amount, the rudder angle varying device is controlled.

According to a study by the present inventors, the following matter is found; namely, in the vehicle provided with the trajectory controlling device, if there is the artificial steering input inputted to the steering input shaft through the steering wheel (generally also referred to as a "handle" in Japanese) by the driver (i.e. if there is an override), the steering by the driver and the control by the trajectory controlling device will likely interfere with each other, and the driver will likely feel uncomfortable. In particular, the control by the trajectory controlling device will be a relatively mild vehicle behavior from the viewpoint of fail safe and due to a recognition time of the in-vehicle camera or the like. Moreover, the steering by the driver is not linked to the control by the trajectory controlling device. Then, due to a delay of following the control by the trajectory controlling device, there will likely be a deviation between the driver's intension and a target for the control by the trajectory controlling device, and the driver will likely feel uncomfortable, or the vehicle behavior will likely become unstable.

Thus, in the present invention, by the changing device which is provided, for example, with a memory, a processor and the like, the responsiveness of the control by the trajectory controlling device is changed when there is the steering input given to the steering input shaft through the steering wheel by the driver of the vehicle (i.e. if there is the override). Specifically, for example, when there is the override, the changing device specifies a trajectory change amount of the vehicle due to the steering input before an influence of the steering input is recognized as a vehicle behavior by the in-vehicle camera or the like and reflects it in the control by the trajectory controlling device, thereby speeding up the responsiveness of the control by the trajectory controlling device. Alternatively, when there is the override, the changing device changes a response frequency of the control by the trajectory controlling device, thereby changing the responsiveness of the control by the trajectory controlling device.

As a result, according to the vehicle driving control apparatus of the present invention, it is possible to suppress the driver's uncomfortable feeling caused by the vehicle responsiveness.

In one aspect of the vehicle driving control apparatus of the present invention, the changing device changes the responsiveness in accordance with a steering speed of the steering input.

According to this aspect, for example, if the steering speed is relatively high, a change in the vehicle behavior is predicted to be relatively large. Thus, a correcting device improves the responsiveness (or response frequency) of the control by the trajectory controlling device. By virtue of such a configuration, it is possible to suppress a relatively significant change in the control amount associated with the control by the trajectory controlling device. Alternatively, it is possible to prevent that the control by the trajectory controlling device cannot follow the steering by the driver and results in a control stop.

On the other hand, if the steering speed is relatively low, the change in the vehicle behavior is predicted to be relatively small. Thus, the correcting device reduces the responsiveness (or response frequency) of the control by the trajectory controlling device. By virtue of such a configuration, it is possible to suppress mutual interference between the steering by the driver and the control by the trajectory controlling device. Alternatively, it is possible to prevent the driver from feeling uncomfortable due to the vehicle responsiveness.

In another aspect of the vehicle driving control apparatus of the present invention, the changing device varies a change amount of the responsiveness in accordance with whether or not a steering direction of the steering input matches a rudder angle control direction of the control by the trajectory controlling device.

According to this aspect, for example, if the steering direction matches the rudder angle control direction (e.g. if the driver steers to approach the target driving route such as the center of a lane), the changing device improves the responsiveness (or response frequency) of the control by the trajectory controlling device. By virtue of such a configuration, it is possible to suppress the occurrence of troubles, such as the vehicle approaches on the right edge side of a lane more than the driver's intension due to the control by the trajectory controlling device which is late for a response in a case where the driver steers such that the vehicle driving on the left edge of the lane approaches the center of the lane.

On the other hand, if the steering direction does not match the rudder angle control direction (e.g. if the driver pulls over the vehicle to the edge of the lane to avoid an obstacle or the like), the changing device reduces the responsiveness (or response frequency) of the control by the trajectory controlling device. By virtue of such a configuration, it is possible to suppress the mutual interference between the steering by the driver and the control by the trajectory controlling device.

The operation and other advantages of the present invention will become more apparent from Mode for Carrying Out the Invention explained below.

MODE FOR CARRYING OUT THE INVENTION

Hereinafter, embodiments of the vehicle driving control apparatus of the present invention will be explained with reference to the drawings.

First Embodiment

A first embodiment of the vehicle driving control apparatus of the present invention will be explained with reference to FIG. 1 and FIG. 2.

Firstly, with reference to FIG. 1, an explanation will be given on the configuration of a vehicle in which the vehicle driving control apparatus in the embodiment is installed. FIG. 1 is a schematic configuration diagram conceptually showing the configuration of the vehicle in the embodiment.

Figure 1:
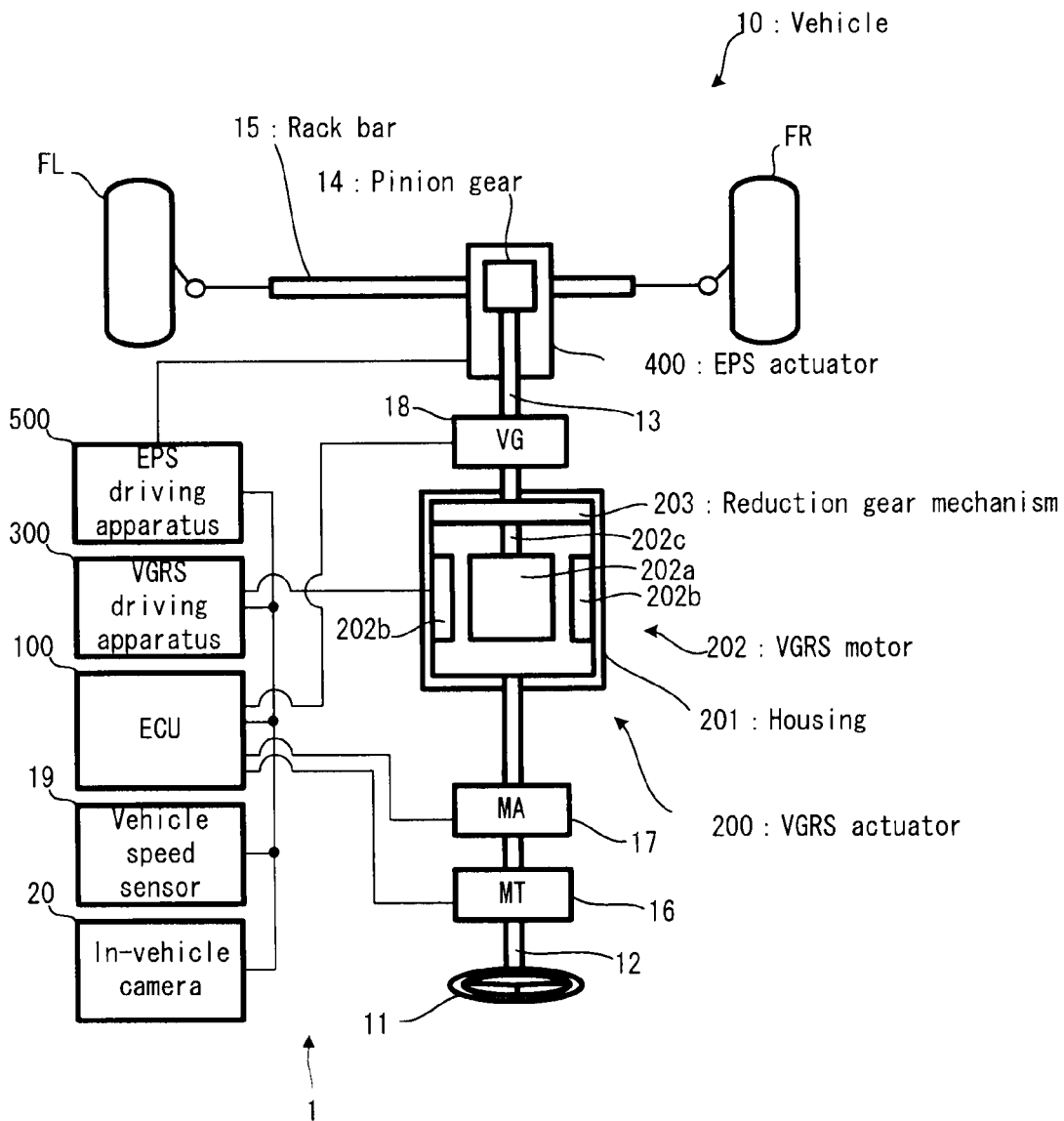
FIG. 1 is a schematic configuration diagram conceptually showing the configuration of a vehicle in a first embodiment.
Figure 2:
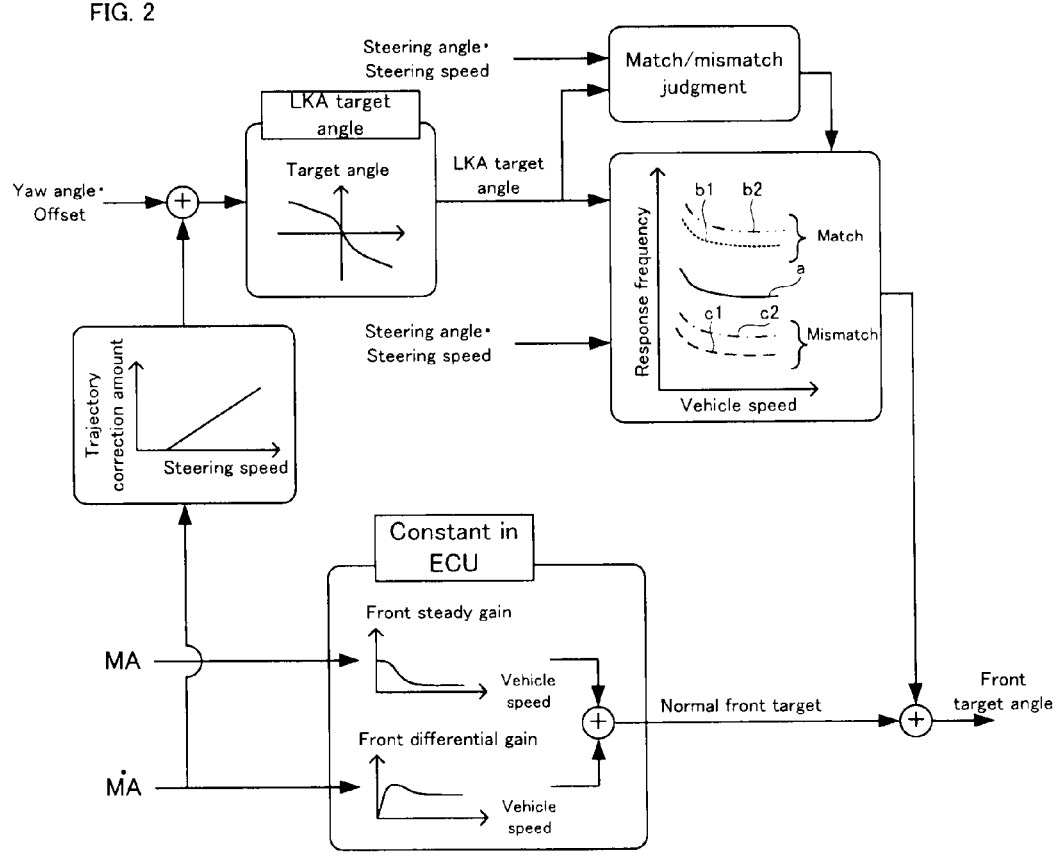
FIG. 2 is a control outline view showing a vehicle driving control process performed by an ECU in the first embodiment.

In FIG. 1, a vehicle 10 is provided with a pair of front wheels FL and FR on either side as steered wheels, and it is configured to move in a desired direction by steering the front wheels. The vehicle 10 is provided with an electronic control unit (ECU) 100, a VGRS actuator 200, a VGRS driving apparatus 300, an EPS actuator 400, and an EPS driving apparatus 500.

The ECU 100 is provided with a central processing unit (CPU), a read only memory (ROM), and a random access memory (RAM), each of which is not illustrated, and it is an electronic control unit capable of controlling all the operations of the vehicle 10. The ECU 100 is configured to perform each of LKA control, EPS control and VGRS control, in accordance with a control program stored in the ROM. Here, the LKA control is control to make the vehicle 10 follow a target driving route (lane). Incidentally, the ECU 100 is one example of the "trajectory controlling device" of the present invention.

In the vehicle 10, a steering input given by a driver through a steering wheel 11 is transmitted to an upper steering shaft 12 which is coaxially rotatably coupled with the steering wheel 11 and which is a shaft body capable of rotating in the same direction as the steering wheel 11. The upper steering shaft 12 is one example of the "steering input shaft" of the present invention. The upper steering shaft 12 is coupled with the VGRS actuator 200 at the end on the downstream side.

The VGRS actuator 200 is provided with a housing 201, a VGRS motor 202 and a reduction gear mechanism 203. The VGRS actuator 200 is one example of the "rudder angle varying device" of the present invention.

The housing 201 is a case or enclosure of a VGRS actuator 200 for accommodating the VGRS motor 202 and the reduction gear mechanism 203. To the housing 201, the upper steering shaft 12 described above is fixed at the end on the downstream side. The housing 201 can rotate integrally with the upper steering shaft 12.

The VGRS motor 202 is a DC brushless motor having a rotor 202a as a rotator, a stator 202b as a stationary part, and a rotating shaft 202c as the output shaft of a driving force. The stator 202b is fixed to the inside of the housing 201, and the rotor 202a is rotatably held within the housing 201. The rotating shaft 202c is coaxially rotatably fixed to the rotor 202a, and its end on the downstream side is coupled with the reduction gear mechanism 203.

The reduction gear mechanism 203 is a planetary gear mechanism having a plurality of rotational elements which can perform differential rotation (a sun gear, a carrier, and a ring gear). One of the plurality of rotational elements, the sun gear is coupled with the rotating shaft 202c of the VGRS motor 202, and the carrier is coupled with the housing 201. Moreover, the ring gear is coupled with a lower steering shaft 13.

According to the reduction gear mechanism 203 having such a configuration, the rotational speed of the upper steering shaft 12 according to the operation amount of the steering wheel 11 (i.e. the rotational speed of the housing 201 coupled with the carrier) and the rotational speed of the VGRS motor 202 (i.e. the rotational speed of the rotating shaft 202c coupled with the sun gear) uniquely determine the rotational speed of the lower steering shaft 13 coupled with the ring gear which is the remaining one rotational element. At this time, it is possible to perform increase/reduction control on the rotational speed of the lower steering shaft 13 by performing increase/reduction control on the rotational speed of the VGRS motor 202 by means of the differential action between the rotational elements. In other words, the upper steering shaft 12 and the lower steering shaft 13 can perform relative rotation by the action of the VGRS motor 202 and the reduction gear mechanism 203. Moreover, in terms of the configuration of each rotational element in the reduction gear mechanism 203, the rotational speed of the VGRS motor 202 is transmitted to the lower steering shaft 13 in the state that it is reduced in accordance with a predetermined reduction ratio which is determined in accordance with a gear ratio between the rotational elements.

As described above, in the vehicle 10, since the upper steering shaft 12 and the lower steering shaft 13 can perform the relative rotation, a steering transmission ratio is continuously variable in a predetermined set range, wherein the steering transmission ratio is a ratio between a steering angle MA as the rotation amount of the upper steering shaft 12 and a rudder angle of the front wheels as the steered wheels which is uniquely determined according to the rotation amount of the lower steering shaft 13 (which is also related to the gear ratio of a rack and pinion mechanism described later).

Incidentally, the reduction gear mechanism 204 may have not only the planetary gear mechanism exemplified here but also another aspect (e.g. an aspect of making the upper steering shaft 12 and the lower steering shaft 13 perform the relative rotation by coupling gears, each of which has the different number of teeth, with the upper steering shaft 12 and the lower steering shaft 13, by disposing a flexible gear which is in contact with each gear in one portion, and by rotating the flexible gear due to a motor torque transmitted through a wave generator, or similar aspects). Alternatively, the reduction gear mechanism 204 may have physical, mechanical, or mechanistic aspect different from the aforementioned aspect even in the case of the planetary gear mechanism.

The VGRS driving apparatus 300 is an electric drive circuit, including a PWM circuit, a transistor circuit, an inverter and the like, capable of electrifying the stator 202b of the VGRS motor 202. The VGRS driving apparatus 300 is electrically connected to a not-illustrated battery, and it can supply a drive voltage to the VGRS motor 202 by using an electric power supplied from the battery. Moreover, the VGRS driving apparatus 300 is electrically connected to the ECU 100, and its operations are controlled by the ECU 100. Incidentally, the VGRS driving apparatus 300 is one example of the "rudder angle varying device" of the present invention, together with the VGRS actuator 200.

The rotation of the lower steering shaft 13 is transmitted to a rack and pinion mechanism. The rack and pinion mechanism is a steering force transmission mechanism including a pinion gear 14 connected to the lower steering shaft 13 at the end on the downstream side and a rack bar 15 in which gear teeth engaging with the gear teeth of the pinion gear are formed. The rotation of the pinion gear 14 is converted to motion in a horizontal direction in FIG. 1 of the rack bar 15, by which a steering force is transmitted to each steered wheel through a tie rod and a knuckle (whose reference numerals are omitted) coupled with both ends of the rack bar 15. In other words, in the vehicle 10, a so-called rack and pinion type steering method is realized.

The EPS actuator 400 is provided with an EPS motor as a DC brushless motor including: a not-illustrated rotor as a rotator to which a permanent magnet is attached; and a stator as a stationary part which surrounds the rotor. The EPS motor can generate an assist torque TA in the direction of rotation of the rotor, which is rotated by the action of a rotating magnetic field formed in the EPS motor due to the electrification to the stator through the EPS driving apparatus 500.

On the other hand, a not-illustrated reduction gear is fixed to a motor shaft as the rotating shaft of the EPS motor, and the reduction gear also engages with the pinion gear 14. Thus, the assist torque TA generated from the EPS motor functions as an assist torque for assisting the rotation of the pinion gear 14. The pinion gear 14 is coupled with the lower steering shaft 13 as described above, and the lower steering shaft 13 is coupled with the upper steering shaft 12 through the VGRS actuator 200. Therefore, a driver steering torque MT applied to the upper steering shaft 12 is transmitted to the rack bar 15 in the form that it is assisted by the assist torque TA, as occasion demands, by which the driver's steering load is reduced.

The EPS driving apparatus 500 is an electric drive circuit, including a PWM circuit, a transistor circuit, an inverter and the like, capable of electrifying the stator of the EPS motor. The EPS driving apparatus 500 is electrically connected to a not-illustrated battery, and it can supply a drive voltage to the EPS motor by using an electric power supplied from the battery. Moreover, the EPS driving apparatus 500 is electrically connected to the ECU 100, and its operations are controlled by the ECU 100.

On the other hand, the vehicle 10 is provided with various sensors including a steering torque sensor 16, a steering angle sensor 17, and a rotation sensor 18.

The steering torque sensor 16 is a sensor capable of detecting the driver steering torque MT applied through the steering wheel 11 from the driver. Explaining it more specifically, the upper steering shaft 12 has such a configuration that it is divided into an upstream part and a downstream part and that the parts are mutually coupled by using a not-illustrated torsion bar. To the both ends on the upstream side and the downstream side of the torsion bar, rings for detecting a rotational phase difference are fixed. The torsion bar is twisted in its rotational direction in accordance with the steering torque (i.e. the driver steering torque MT) transmitted via the upstream part of the upper steering shaft 12 when the driver of the vehicle 10 operates the steering wheel 11, and the torsion bar can transmit the steering torque to the downstream part with the twist generated. Therefore, upon the transmission of the steering torque, there is the rotational phase difference between the rings for detecting the rotational phase difference described above. The steering torque sensor 16 can detect the rotational phase difference, convert the rotational phase difference to the steering torque, and output it as an electrical signal corresponding to the driver steering torque MT. Moreover, the steering torque sensor 16 is electrically connected to the ECU 100, and the detected driver steering torque MT is referred to by the ECU 100 with a constant or irregular period.

The steering angle sensor 17 is an angle sensor capable of detecting the steering angle MA which indicates the rotation amount of the upper steering shaft 12. The steering angle sensor 17 is electrically connected to the ECU 100, and the detected steering angle MA is referred to by the ECU 100 with a constant or irregular period.

The rotation sensor 18 is a rotary encoder capable of detecting a rotational phase difference between the housing 201 of the VGRS actuator 200 (i.e. which is equivalent to the upper steering shaft 12 in terms of a rotation angle) and the lower steering shaft 13. The rotation sensor 18 is electrically connected to the ECU 100, and the detected rotational phase difference is referred to by the ECU 100 with a constant or irregular period.

A vehicle speed sensor 19 is a sensor capable of detecting a vehicle speed V as the speed or velocity of the vehicle 10. The vehicle speed sensor 19 is electrically connected to the ECU 100, and the detected vehicle speed V is referred to by the ECU 100 with a constant or irregular period.

An in-vehicle camera 20 is an imaging apparatus which is disposed on the front nose of the vehicle 10 and which can image a predetermined area ahead of the vehicle 10. The in-vehicle camera 20 is electrically connected to the ECU 100, and the imaged area ahead is transmitted to the ECU 100 as image data with a constant or irregular period. The ECU 100 can analyze the image data and obtain various data necessary for the LKA control.

A vehicle driving control apparatus 1 in the embodiment is provided with the ECU 100 as one example of the "changing device" of the present invention, for changing the responsiveness of trajectory control, which is control associated with the VGRS driving apparatus 300 by the ECU 100, when the steering input is given to the upper steering shaft 12 through the steering wheel 11 by the driver of the vehicle 10.

In the embodiment, one portion of the ECU 100 for various electronic controls of the vehicle 10 is used as one portion of the vehicle driving control apparatus 1. Incidentally, the physical, mechanical and electrical configurations of the "changing device" and the like of the present invention are not limited to the aforementioned configurations but may be configured as various computer systems or the like such as a plurality of ECUs, various processing units, various controllers or microcomputer apparatuses.

Next, with reference to FIG. 2, an explanation will be given on a vehicle driving control process performed by the ECU 100 as one portion of the vehicle driving control apparatus 1. FIG. 2 is a control outline view showing the vehicle driving control process performed by the ECU in the embodiment. In the embodiment, as a result of such an action that an operation button for initiating the LKA control, disposed in advance in the vehicle interior of the vehicle 10, is operated by the driver or similar actions, a LKA mode is selected.

The ECU 100 reads various signals including sensor signals or the like associated with the various sensors provided for the vehicle 10. The ECU 100 calculates or estimates, for example, a yaw angle (or yaw angle deviation), offset (i.e. a deviation in the lateral direction between the vehicle 10 and a white line for defining the target driving route of the LKA) and the like, on the basis of the read signals or the like.

If the steering wheel 11 is steered by the driver (i.e. if there is an override), the ECU 100 calculates a trajectory correction amount on the basis of a steering angular velocity, which is the time derivative of the steering angle MA, and a map or the like, in parallel with the calculation or estimation of the yaw angle and the offset or the like described above.

Moreover, the ECU 100 determines from a map or the like a VGRS basic target angle, which is a basic value of the relative rotation angle of the lower steering shaft 13 with respect to the steering angle MA, which is the rotation angle of the upper steering shaft 12, on the basis of the steering angle MA and the steering angular velocity.

The ECU 100 determines from a map or the like a LKA basic target angle associated with the trajectory control on the basis of the yaw angle and the offset and the calculated trajectory correction amount in parallel with the determination of the VGRS basic target angle described above. Then, the ECU 100 compares the determined LKA basic target angle with the steering angle MA and the steering speed, and judges whether or not the steering direction of the steering input by the driver matches a rudder angle control direction of the trajectory control.

Incidentally, whether or not the steering direction matches the rudder angle control direction may be judged on the basis of whether or not the positive or negative sign of the value of the steering angle MA matches the positive or negative sign of the value of the LKA basic target angle, wherein a change in the steering angle MA and the rudder angle in one direction is indicated by a positive value and a change in a direction opposite to the one direction is indicated by a negative value.

Then, the ECU 100 determines a response frequency associated with the trajectory control from a map indicating a relation between the vehicle speed and the response frequency, on the basis of the determined LKA basic target angle, the steering angle MA, the steering speed, and a result of the judgment of whether or not steering direction matches the rudder angle control direction.

Here, the map indicating the relation between the vehicle speed and the response frequency will be explained. A solid line a in the map indicates the response frequency associated with the normal trajectory control (i.e. the response frequency in a case where there is no override). A dotted line b1 and an alternate long and two short dashes line b2 indicate the response frequencies associated with the trajectory control in a case where there is the override and the steering direction matches the rudder angle control direction. A dashed line c1 and an alternate long and short dash line c2 indicate the response frequencies associated with the trajectory control in a case where there is the override and the steering direction does not match the rudder angle control direction.

The response frequency indicated by the alternate long and two short dashes line b2 is a response frequency corresponding to a steering speed faster than a steering speed corresponding to the response frequency indicated by the dotted line b1. In the same manner, the response frequency indicated by the alternate long and short dash line c2 is a response frequency corresponding to a steering speed faster than a steering speed corresponding to the response frequency indicated by the dashed line c1. As described above, in the embodiment, the response frequency is changed in accordance with the steering speed. Specifically, the response frequency is changed such that the response frequency increases as the steering speed increases.

The response frequencies indicated by the dotted line b1 and the alternate long and two short dashes line b2 are higher than the normal response frequency indicated by the solid line a. On the other hand, the response frequencies indicated by the dashed line c1 and the alternate long and short dash line c2 are lower than the normal response frequency indicated by the solid line a. As described above, in the embodiment, the response frequency varies depending on whether or not the steering direction matches the rudder angle control direction. Specifically, the response frequency is increased if the steering direction matches the rudder angle control direction. On the other hand, the response frequency is reduced if the steering direction does not match the rudder angle control direction.

After the determination of the response frequency associated with the trajectory control, the ECU 100 adds the determined LKA basic target angle to the determined VGRS basic target angle at the determined response frequency associated with the trajectory control, thereby calculating a VGRS final target angle.

The ECU 100 controls the VGRS driving apparatus 300 (refer to FIG. 1) on the basis of the calculated VGRS final target angle and rotates the VGRS motor 202 of the VGRS actuator 200 by an amount corresponding to the calculated VGRS final target angle.

On the other hand, if the steering wheel 11 is not steered by the driver (i.e. there is no override), the ECU 100 determines from the map or the like the LKA basic target angle associated with the trajectory control on the basis of the yaw angle and the offset. Then, the ECU 100 outputs the determined LKA basic target angle at the response frequency associated with the normal trajectory control indicated by the solid line a. Here, if there is no override, the VGRS basic target angle is not outputted. Thus, the determined LKA basic target angle is the VGRS final target angle.

Figure 3:
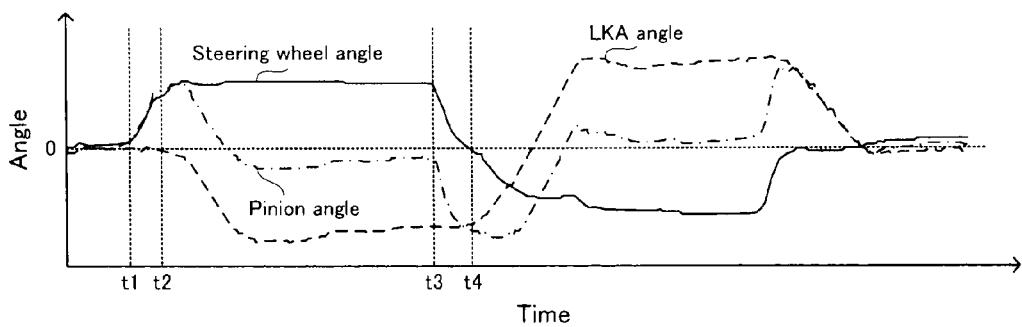
FIG. 3 is one example of a time chart showing a time change in each of a steering wheel angle, a pinion angle, and a LKA target angle of a vehicle in a comparative example.

Here, a comparative example of the vehicle driving control apparatus 1 will be explained with reference to a timing chart in FIG. 3. Incidentally, the configuration of a vehicle in which the vehicle driving control apparatus in the comparative example is installed is the same as that of the vehicle 10 described above. In FIG. 3, a "steering wheel angle", a "LKA angle", and a "pinion angle" mean a "steering angle", a "target angle associated with the trajectory control", and a "final rudder angle of the vehicle", respectively.

It is assumed that when the LKA mode is selected, the driver steers the steering wheel 11 such that the trajectory of the vehicle deviates from the target driving route at a time point t1 in FIG. 3. Until a time point t2 in FIG. 3, the trajectory control is not started because an influence of the steering input, for example, by the in-vehicle camera or the like is not recognized as a vehicle behavior by the ECU or the like. In other words, since a predetermined time is necessary for the ECU or the like to recognize vehicle behavior variation, there is a predetermined time lag between a time point of the steering input and a time point of starting the trajectory control. Therefore, in a period from the time point t1 to the time point t2, the vehicle reacts as intended by the driver.

On the other hand, after the time point t2, the LKA angle is set in a direction opposite to the steering input by the driver (i.e. the steering wheel angle) due to the trajectory control. Thus, the vehicle likely does not turn as intended by the driver (refer to the pinion angle in FIG. 3). In other words, the responsiveness of the vehicle decreases, or the vehicle does not respond.

Therefore, due to a difference between the responsiveness of the vehicle in the period from the time point t1 to the time point t2 and the responsiveness of the vehicle after the time point t2, the driver likely feels uncomfortable.

Moreover, it is assumed that the driver steers the steering wheel 11 such that the trajectory of the vehicle approaches the target driving route at a time point t3 in FIG. 3. Until a time point t4 in FIG. 3, the trajectory control is not started, and moreover, the LKA angle is set such that the trajectory of the vehicle approaches the target driving. Thus, in a period from the time point t3 to the time point t4, the vehicle behavior likely becomes excessive.

On the other hand, after the time point t4, the LKA angle is set in a direction opposite to the steering input by the driver due to the trajectory control. Thus, the vehicle likely does not turn as intended by the driver.

Therefore, due to a difference between the responsiveness of the vehicle in the period from the time point t3 to the time point t4 and the responsiveness of the vehicle after the time point t4, the driver likely feels uncomfortable.

However, in the vehicle driving control process associated with the vehicle driving control apparatus 1, as described above, if there is the override, the trajectory correction amount is calculated on the basis of the steering angular velocity, and the calculated trajectory correction amount is used in the determination of the LKA basic target angle. Thus, before or immediately after the influence of the steering input appears in the actual vehicle behavior, it is possible to start the trajectory control which takes into account the influence of the steering input. In other words, it is possible to shorten or eliminate the time lag between the time point of the steering input and the time point of starting the trajectory control. Therefore, it is possible to suppress the driver's uncomfortable feeling caused by the vehicle responsiveness.

Second Embodiment

Figure 4:
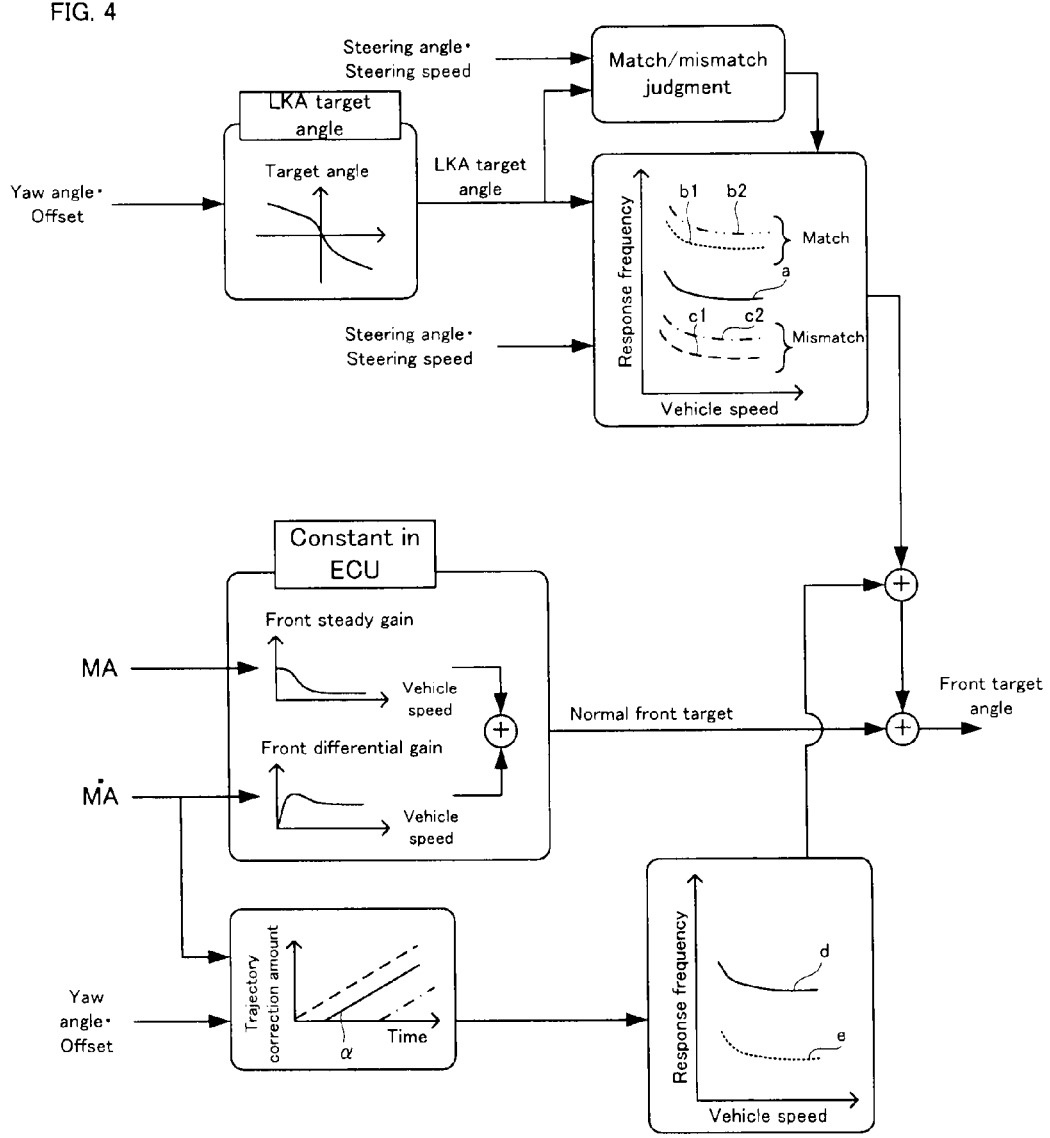
FIG. 4 is a control outline view showing a vehicle driving control process performed by the ECU in a second embodiment.

A second embodiment of the vehicle driving control apparatus of the present invention will be explained with reference to FIG. 4. The second embodiment has the same configuration as that of the first embodiment, except for a partial difference in the vehicle driving control process. Thus, in the second embodiment, the explanation that overlaps the first embodiment will be omitted, and common points on the drawing will carry the same reference numerals. Only the point that is basically different will be explained with reference to FIG. 4.

If the steering wheel 11 is steered by the drier (i.e. if there is the override), the ECU 100 calculates the trajectory correction amount on the basis of the yaw angle, the offset, the steering angular velocity, and the map or the like. Incidentally, if the driver steers it to the side that the trajectory of the vehicle 10 deviates from the target driving route, a solid line a is shifted to a dashed line side on two-dimensional coordinates in which time and the trajectory correction amount are used as parameters. On the other hand, if the driver steers it to the side that the trajectory of the vehicle 10 approaches the target driving route, the solid line a is shifted to an alternate long and short dash line side on the two-dimensional coordinates.

Then, the ECU 100 outputs the calculated trajectory correction amount at a response frequency (refer to a solid line d) which is higher than a response frequency associated with the normal trajectory control indicated by a dashed line e. Then, the ECU 100 adds the calculated trajectory correction amount and the determined LKA basic target angle, thereby calculating a LKA correction target angle. Then, the ECU 100 adds the calculated LKA correction target angle and the determined VGRS basic target angle, thereby calculating the VGRS final target angle.

In the embodiment, if there is the override, the trajectory correction amount is calculated on the basis of the steering angular velocity or the like, and the LKA basic target angle is corrected by the calculated trajectory correction amount. Thus, before or immediately after the influence of the steering input appears in the actual vehicle behavior, it is possible to start the trajectory control which takes into account the influence of the steering input.

The present invention is not limited to the aforementioned embodiments, but various changes may be made, if desired, without departing from the essence or spirit of the invention which can be read from the claims and the entire specification. A vehicle driving control apparatus, which involves such changes, is also intended to be within the technical scope of the present invention.

DESCRIPTION OF REFERENCE CODES

1 vehicle driving control apparatus
10 vehicle
11 steering wheel
12 upper steering shaft
100 ECU
200 VGRS actuator
300 VGRS driving apparatus

The invention claimed is:

1. A vehicle driving control apparatus comprising:
a rudder angle varying device capable of changing a relation between a steering angle, which is a rotation angle of a steering input shaft, and a rudder angle, which is a rotation angle of steered wheels; and
a trajectory controlling device for controlling said rudder angle varying device such that a trajectory of a vehicle approaches a target driving route of the vehicle,
said vehicle driving control apparatus comprising:
a changing device for changing time responsiveness of control by said trajectory controlling device when there is a steering input given to the steering input shaft through a steering wheel by a driver of the vehicle.

2. The vehicle driving control apparatus according to claim 1, wherein said changing device changes the time responsiveness in accordance with a steering speed of the steering input.

3. The vehicle driving control apparatus according to claim 1, wherein said changing device varies a change amount of the time responsiveness in accordance with whether or not a steering direction of the steering input matches a rudder angle control direction of the control by said trajectory controlling device.

* * * * *